(12) United States Patent
Agarwal et al.

(10) Patent No.: US 11,025,361 B2
(45) Date of Patent: Jun. 1, 2021

(54) SYSTEM AND METHOD FOR CONFIGURING PHOTONIC COMPONENTS USING PHOTONIC ABSTRACTION INTERFACE

(71) Applicant: Sterlite Technologies Limited, Gurgaon (IN)

(72) Inventors: Puneet Kumar Agarwal, Gurgaon (IN); Vishnu Krishna, Gurgaon (IN)

(73) Assignee: STERLITE TECHNOLOGIES LIMITED, Haryana (IN)

( * ) Notice: Subject to any disclaimer, the term of this patent is extended or adjusted under 35 U.S.C. 154(b) by 21 days.

(21) Appl. No.: 16/691,820

(22) Filed: Nov. 22, 2019

(65) Prior Publication Data
US 2021/0091874 A1    Mar. 25, 2021

(30) Foreign Application Priority Data

Sep. 25, 2019 (IN) .............................. 201911038765

(51) Int. Cl.
*H04J 14/00* (2006.01)
*H04J 14/02* (2006.01)
*H04Q 11/00* (2006.01)

(52) U.S. Cl.
CPC ...... *H04J 14/0212* (2013.01); *H04Q 11/0062* (2013.01); *H04Q 2011/0079* (2013.01)

(58) Field of Classification Search
CPC .. H04J 14/0212; H04J 14/02; H04Q 11/0062; H04Q 11/0066; H04Q 11/0067; H04Q 11/0005; H04Q 11/0003; H04B 10/0795; H04B 10/038

USPC ........ 398/45, 46, 47, 48, 49, 50, 51, 53, 56, 398/57, 59, 79, 33, 38, 3, 5, 83, 25
See application file for complete search history.

(56) References Cited

U.S. PATENT DOCUMENTS

| | | | |
|---|---|---|---|
| 2008/0298805 A1* | 12/2008 | Lee ...................... | H04L 45/02 398/48 |
| 2010/0142943 A1* | 6/2010 | Frankel ............... | H04J 14/0257 398/25 |
| 2010/0221003 A1* | 9/2010 | Bernstein ............ | H04J 14/0257 398/48 |

* cited by examiner

*Primary Examiner* — Hanh Phan

(57) ABSTRACT

The present disclosure provides system to configure one or more photonics components using a method. The method includes a first step to initialize a photonic abstraction interface driver at a photonic abstraction system. In addition, the method includes another step to call a node detection function at the photonic abstraction system. Further, the method includes yet another step to call a plurality of application programming interfaces (APIs) at the photonic abstraction system. Furthermore, the method includes yet another step to de-initialize the photonic abstraction interface driver at the photonic abstraction system. Moreover, the photonic abstraction interface driver is initialized by a photonic abstraction interface host. Also, the photonic abstraction interface host and the photonic abstraction interface driver are layers of a photonic abstraction interface (PAI). Also, the photonic abstraction interface driver translates the photonic abstraction interface (PAI) into a plurality of shared libraries.

12 Claims, 3 Drawing Sheets

SYSTEM AND METHOD FOR CONFIGURING PHOTONIC COMPONENTS USING PHOTONIC ABSTRACTION INTERFACE

BACKGROUND OF THE INVENTION

Field of the Invention

The present invention relates to the field of optical network technology and in particular, relates to a system and method to configure one or more photonic components using a photonic abstraction interface. The present application is based on, and claims priority from an Indian Application Number 201911038765 filed on 25 Sep. 2019, the disclosure of which is hereby incorporated by reference herein.

Description of the Related Art

Optical fibres have secured an important position in building optical network of modern communication systems across the world. A network operator utilizes a plurality of optical line system hardware to establish successful optical network. Conventionally, the network operators are bound to use each of the plurality of optical line system hardware from same manufacturers. Further, the network operators are bound to use various software and management systems of the same manufacturers. Furthermore, each of the plurality of optical line system hardware of one manufacturer communicates with hardware of the same manufacturer. This restricts network operators from any type of modification in the plurality of optical line system hardware. In addition, it makes the network operators dependent on the manufacturer. Further, this complicates the process of configuring the plurality of optical line system hardware. Also, network configuration becomes a critical requirement for the network operators to match pace with growing demand due to dependency of the network operators on manufacturers.

In light of the above stated discussion, there is a need for a system that overcomes the above stated disadvantages of prior art.

BRIEF SUMMARY OF THE INVENTION

The present disclosure provides a system for configuring one or more photonic components. The system includes one or more processors and a memory. The memory is coupled to the one or more processors. The memory stores instructions. The instructions are executed by the one or more processors. The execution of instructions causes the one or more processors to perform a method to configure the one or more photonic components using a photonic abstraction interface (PAI). The method includes a first step to initialize a photonic abstraction interface driver at a photonic abstraction system. In addition, the method includes another step to call a node detection function at the photonic abstraction system. Further, the method includes yet another step to call a plurality of application programming interfaces (APIs) at the photonic abstraction system. Furthermore, the method includes yet another step to de-initialize the photonic abstraction interface driver at the photonic abstraction system, in the event of system shutdown or node removal. Moreover, the photonic abstraction interface driver is initialized by a photonic abstraction interface host. Also, the photonic abstraction interface host and the photonic abstraction interface driver are layers of the photonic abstraction interface (PAI). Also, the photonic abstraction interface driver translates the photonic abstraction interface (PAI) into a plurality of shared libraries. Also, the node detection function is called using the initialized photonic abstraction interface host. Also, the node detection function facilitates to detect a node. Also, the detected node allows the photonic abstraction interface driver to call a plurality of application programming interfaces (APIs). Also, each application programming interface (API) of the plurality of application programming interfaces (APIs) creates, removes, sets and receives a plurality of attributes. Also, the plurality of attributes is associated with each application programming interface (API) of the plurality of application programming interfaces (APIs). Also, the photonic abstraction interface driver is de-initialized by the photonic abstraction interface host. Also, the photonic abstraction interface driver is de-initialized after completion of process associated with the photonic abstraction interface (PAI). Also, the photonic abstraction interface driver performs one or more functions during de-initialization.

A primary object of the present disclosure is to provide a photonic abstraction interface to configure one or more photonic components in a vendor independent way.

Another object of the present disclosure is to provide the photonic abstraction interface to control the one or more photonic components regardless of hardware devices.

Yet another object of the present disclosure is to provide the photonic abstraction interface that allows photonic node controller to access hardware devices.

In an aspect, the present disclosure provides a system for configuring one or more photonic components. The system includes one or more processors and a memory. The memory is coupled to the one or more processors. The memory stores instructions. The instructions are executed by the one or more processors. The execution of instructions causes the one or more processors to perform a method to configure the one or more photonic components using a photonic abstraction interface (PAI). The method includes a first step to initialize a photonic abstraction interface driver at a photonic abstraction system. In addition, the method includes another step to call a node detection function at the photonic abstraction system. Further, the method includes yet another step to call a plurality of application programming interfaces (APIs) at the photonic abstraction system. Furthermore, the method includes yet another step to de-initialize the photonic abstraction interface driver at the photonic abstraction system, in the event of a system shutdown or node removal. Moreover, the photonic abstraction interface driver is initialized by a photonic abstraction interface host through which the user interacts with the software. Also, the photonic abstraction interface host and the photonic abstraction interface driver are layers of the photonic abstraction interface (PAI). Also, the photonic abstraction interface driver translates the photonic abstraction interface (PAI) into a plurality of shared libraries. Also, the node detection function is called, after the PAI driver is initialized. Also, the node detection function facilitates to detect a node. Also, the detected node allows the photonic abstraction interface driver to call a plurality of application programming interfaces (APIs). Also, each application programming interface (API) of the plurality of application programming interfaces (APIs) creates, removes, sets and receives a plurality of attributes. Also, the plurality of attributes is associated with each application programming interface (API) of the plurality of application programming interfaces (APIs). Also, the photonic abstraction interface driver is de-initialized by the photonic abstraction interface host. Also, the photonic abstraction interface driver is de-initialized after completion of process associated with the photonic abstraction interface (PAI). Also, the photonic abstraction interface driver performs one or more functions during de-initialization.

In an embodiment of the present disclosure, the photonic abstraction interface (PAI) layer provides common interface for the one or more photonic components. In addition, the one or more photonic components include but may not be limited to reconfiguration optical add-drop multiplexer (ROADM) node equipped with wavelength selective switch (WSS), multiplexer-demultiplexer unit (MDU), amplifiers, variable optical attenuator (VOA) and in-line amplifier (ILA) nodes.

In an embodiment of the present disclosure, the plurality of application programming interfaces (APIs) includes but may not be limited to a pai_node or photonic abstraction interface node, a pai_network or photonic abstraction interface network and a pai_service or photonic abstraction interface service.

In an embodiment of the present disclosure, the plurality of attributes associated with the pai_node or photonic abstraction interface node of the plurality of application programming interfaces (APIs) includes but may not be limited to node type, vendor, version, domain subnetwork, IP, shelf, relay shelf, geographical location, node status, number of degrees or SRGs, maintenance schedule, hardware specifics.

In an embodiment of the present disclosure, the plurality of attributes associated with the pai_network or photonic abstraction interface network of the plurality of application programming interfaces (APIs) includes but may not be limited to degree or add-drop port (ADP) identifier, maximum number of wavelengths, used wavelengths, ingress span loss, end of life (EOL) maximum load, number or add-drop ports, currently provisioned ports, wavelength duplication.

In an embodiment of the present disclosure, the plurality of attributes associated with the pai_service or photonic abstraction interface service of the plurality of application programming interfaces (APIs) includes but may not limited to link type, traffic engineering (TE) metrics, operational state, link latency and link mapping.

In an embodiment of the present disclosure, the one or more functions include at least one of erasing memory and closing files. In addition, the one or more functions are performed by the de-initialized photonic abstraction interface (PAI) to end operations initiated by the photonic abstraction interface (PAI).

In an embodiment of the present disclosure, the plurality of application programming interfaces (APIs) includes the pai_node or photonic abstraction interface node. In addition, the pai_node or photonic abstraction interface node represents a ROADM node. Further, the pai_node or photonic abstraction interface node has two different types of object. Furthermore, two different types of object include degree and add or drop port (ADP).

In an embodiment of the present disclosure, the plurality of application programming interfaces (APIs) includes the pai_network or photonic abstraction interface network. In addition, the pai_network or photonic abstraction interface network allows a user to configure and read data correspond to each degree and add-drop port (ADP).

In an embodiment of the present disclosure, the plurality of application programming interfaces (APIs) includes the pai_service or photonic abstraction interface service. In addition, the pai_service or photonic abstraction interface service facilitates interconnection of the pai_network or photonic abstraction interface network inside the pai_node or photonic abstraction interface node. Further, the pai_service or photonic abstraction interface service includes a plurality of links.

Furthermore, the plurality of links includes at least one of an express link, an add link and a drop link.

In an embodiment of the present disclosure, the photonic abstraction system includes but not be limited to PAI mux, a plurality of shared libraries and a plurality of hardware devices.

DESCRIPTION OF THE DRAWINGS

Figure 1:
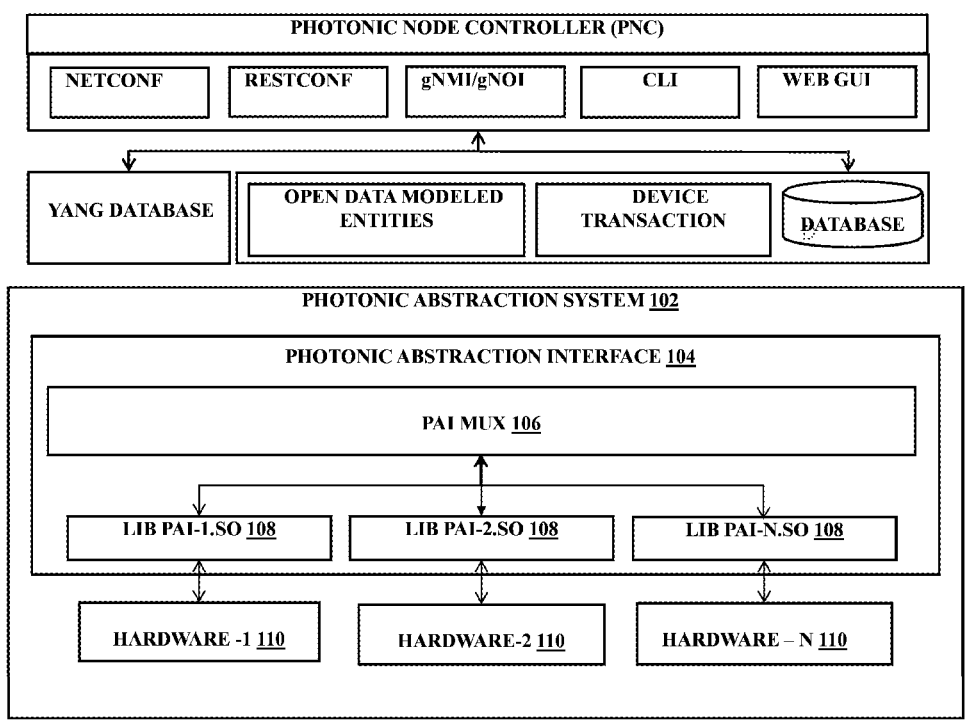

Having thus described the invention in general terms, reference will now be made to the accompanying drawings, which are not necessarily drawn to scale, and wherein:

FIG. 1 illustrates an interactive computing environment to configure one or more photonic components using a photonic abstraction system, in accordance with various embodiments of the present disclosure.

Figure 2:
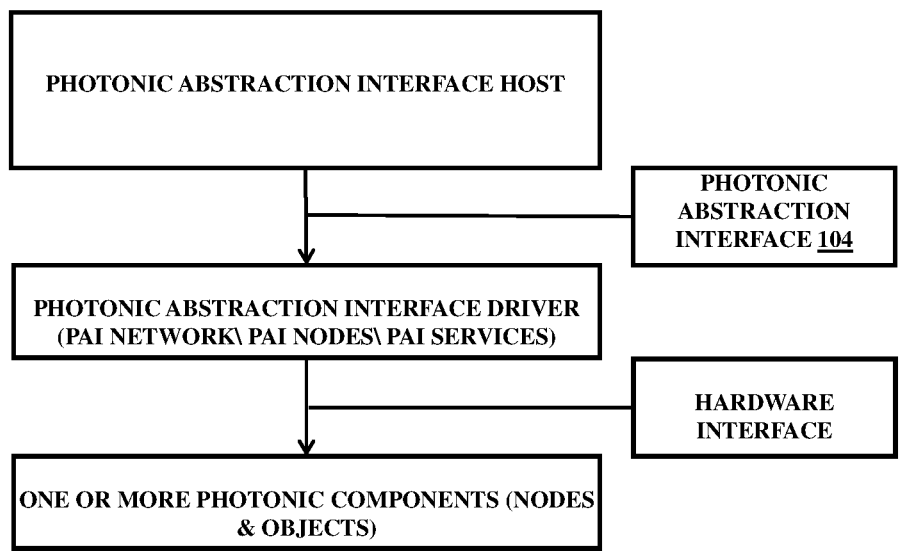

FIG. 2 illustrates a block diagram of a photonic abstraction interface structure, in accordance with various embodiments of the present disclosure.

Figure 3:
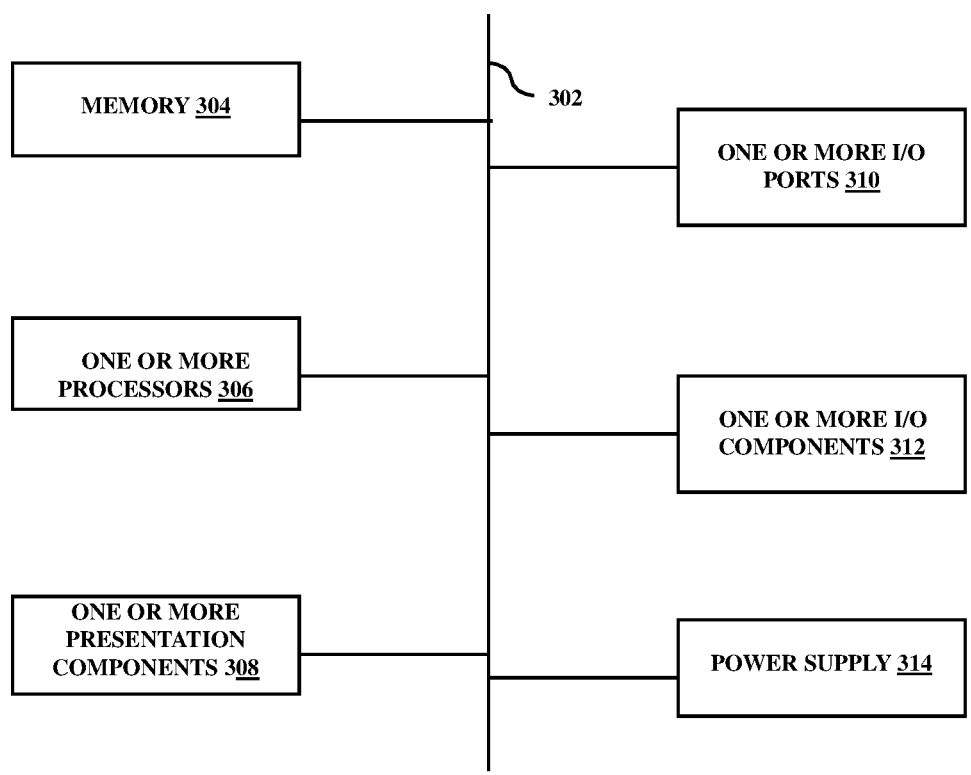

FIG. 3 illustrates a block diagram of a computing device, in accordance with various embodiments of the present disclosure.

It should be noted that the accompanying drawings are intended to present illustrations of exemplary embodiments of the present disclosure. These figures are not intended to limit the scope of the present disclosure. It should also be noted that accompanying figures are not necessarily drawn to scale.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates an interactive computing environment 100 to configure one or more photonic components using a photonic abstraction system 102, in accordance with various embodiments of the present disclosure. The interactive computing environment 100 illustrates an environment suitable for interactive reception and analysis of a plurality of optical wavelengths. The interactive computing environment 100 is configured to provide a setup to switch the plurality of optical wavelengths within an optical network using a common interface.

The interactive computing environment 100 includes a photonic node controller (PNC) and the photonic abstraction system 102. In an embodiment of the present disclosure, the photonic node controller lies above the photonic abstraction system 102. The photonic node controller includes NETCONF, RESTCONF, GNMI or GNOI, CLI, Web GUI, a YANG database and another database which contains data related to configurations, nodes, and operations. The photonic abstraction system 102 includes a PAI mux 106, LIB PAI-1.SO 108, LIB PAI-2.SO 108, LIB PAI-N.SO 108, hardware-1 110, hardware-2 110 and hardware-N 110. In addition, the photonic abstraction system 102 configures one or more photonic components using a photonic abstraction interface.

The photonic abstraction interface 104 controls the one or more photonic components regardless of a plurality of hardware devices. Further, the one or more photonic components include but may not be limited to reconfiguration optical add-drop multiplexer (ROADM) node equipped with wavelength selective switch (WSS), multiple dwelling unit (MDU), amplifiers, variable optical attenuator (VOA) and in-line amplifier (ILA) nodes.

The photonic node controller includes NETCONF. In addition, NETCONF corresponds to network configuration protocol. Further, NETCONF installs, manipulates and delete configuration of one or more network devices. Furthermore, the one or more network devices include but may not be limited to hub, switch, router, modem, gateway, bridge, repeater and access point. In general, NETCONF protocol uses mechanism to manage, configure, retrieve and manipulate network devices. In addition, NETCONF provides communication between client and server using RPC based mechanism. Further, server corresponds to network device. Furthermore, NETCONF protocol defines one or more datastores. Moreover, one or more datastores include candidate, running and startup. Also, NETCONF protocol defines one or more operations. Also, one or more operations include create, retrieve, update, and delete operations to access one or more datastores.

The photonic node controller includes RESTCONF. In addition, RESTCONF is a protocol that runs over Hyper Text Transfer Protocol (HTTP). Further, RESTCONF accesses data defined in the YANG database using one or more datastores defined in NETCONF. In general, RESTCONF defines mapping of YANG specification to RESTful interface. In addition, RESTCONF protocol operates on conceptual datastore that is defined with YANG data modelling language. Further, RESTCONF allows access to one or more datastores present in controller. Furthermore, RESTCONF supports one or more operations. Moreover, one or more operations include OPTIONS, GET, PUT, POST and DELETE operations.

The photonic node controller includes gNMI or gNOI. In addition, gNMI or gNOI corresponds to gRPC network management or gRPC network operations interface. In an embodiment of the present disclosure, gNMI or gNOI provides a single service for state management. In addition, state management corresponds to streaming telemetry and configuration. In an embodiment of the present disclosure, gNMI or gNOI is built on a modern standard, secure transport and open RPC (Remote Procedure Call) with many language bindings. In addition, gNMI or gNOI supports serialization and provides data access. Further, gNMI or gNOI purposes an alternative to NETCONF and RESTCONF. In general, gNMI facilitates Remote Procedure Calls (RPCs) and managing state to support state retrieval and state modification.

The photonic node controller includes CLI. In addition, CLI corresponds to command line interface. In general, command line interface is used to view and manage computer files. In addition, command line interface is text-based user interface. The photonic node controller includes GUI. In addition, web GUI corresponds to web graphical user interface. In general, graphical user interface is user interface that allows each user of a plurality of users to interact with electronic devices through graphical icons and visual indicators.

The photonic node controller includes the yang database. The yang database includes all parameters of detected devices. In general, database is a collection of information that is organized so that it can be easily accessed, managed and updated. In an embodiment of the present disclosure, the yang database provides all parameters required by the photonic node controller.

The photonic node controller includes the database. The database is used for storage purposes. The database is associated with a server. In general, database is a collection of information that is organized so that it can be easily accessed, managed and updated. In an embodiment of the present disclosure, the database provides storage location to all data and information required by the photonic node controller. In an embodiment of the present disclosure, the database may be at least one of hierarchical database, network database, relational database, object-oriented database and the like. However, the database is not limited to the above-mentioned databases.

The interactive computing environment 100 includes the photonic abstraction system 102. In an embodiment of the present disclosure, the photonic abstraction system 102 is associated with the photonic node controller. In an embodiment of the present disclosure, the photonic abstraction system 102 includes the photonic abstraction interface 104. The photonic abstraction interface 104 allows the photonic node controller to discover and gain access to underlying hardware of the one or more photonic components. In addition, the photonic abstraction interface 104 is an open API to configure the one or more photonic components. Further, the one or more photonic components correspond to optical devices associated with open line system. Furthermore, the one or more photonic components include but may not be limited to ROADM devices. Moreover, the optical devices associated with the open line system are configured with facilitation of the photonic abstraction interface 104.

Moreover, the photonic abstraction system 102 includes the PAI mux 106. In an embodiment of the present disclosure, the PAI mux 106 assigns an object id to the plurality of hardware devices of a plurality of vendors. In addition, the object id assigned is different for each hardware of the plurality of hardware devices. In an example, consider a vendor A and vendor B has ROADM device A and ROADM device B respectively. In addition, ROADM device A and ROADM device B has one or more features. Further, the one or more features of ROADM device A and ROADM device B are extracted and stored by the photonic abstraction interface 104. Furthermore, the photonic abstraction interface 104 commands the PAI mux 106 to assign the object ID to ROADM device A and ROADM device B. Moreover, the object ID facilitates identification of ROADM device A and ROADM device B to the photonic node controller. Also, the object ID associated with ROADM device A and ROADM device B is stored at different memory locations.

The photonic abstraction system 102 includes a plurality of shared libraries. In addition, the plurality of shared libraries includes lib PAI-1.SO 108, lib PAI-2.SO 108 and lib PAI-N.SO 108. In an embodiment of the present disclosure, the plurality of shared libraries is created for the plurality of hardware devices. In addition, the plurality of hardware devices is associated with the plurality of vendors. Further, the plurality of hardware devices includes hardware-1 110, hardware-2 110 and hardware-N 110. Further, hardware-1 110 is associated with lib PAI-1.SO 110. Furthermore, hardware-2 110 is associated with PAI-2.SO 110. Moreover, hardware-N 110 is associated with lib PAI-N.SO 110. In an embodiment of the present disclosure, the plurality of shared libraries stores device data of the plurality of hardware devices. In an embodiment of the present disclosure, the plurality of hardware devices may interact with the photonic node controller through the photonic abstraction interface 104. The photonic abstraction interface 104 allows interaction of the plurality of hardware devices with the photonic node controller.

FIG. 2 illustrates a block diagram of a photonic abstraction interface structure 200, in accordance with various embodiments of the present disclosure. The photonic abstraction interface structure 200 includes a photonic abstraction interface host, a photonic abstraction interface driver and the one or more photonic components. The photonic abstraction interface host initializes the photonic abstraction interface driver. In addition, the photonic abstraction interface driver is initialized with command pai_init. Further, the command pai_init is initiated by the photonic abstraction interface host. Furthermore, the initialized photonic abstraction interface driver initializes different data structures. Moreover, the photonic abstraction interface host calls a plurality of application programming interfaces (APIs). Also, the plurality of application programming interfaces (APIs) includes pai_node or photonic abstraction interface node, pai_network or photonic abstraction interface network and pai_service or photonic abstraction interface service. Also, the plurality of application programming interfaces (APIs) creates, removes, sets and receives a plurality of attributes associated with each of the plurality of application programming interfaces (APIs).

In an embodiment of the present disclosure, the photonic abstraction interface host is associated with the photonic abstraction interface driver. In addition, the photonic abstraction interface host is associated with the photonic abstraction interface driver through the photonic abstraction interface 104. In an embodiment of the present disclosure, the photonic abstraction interface driver is connected with the one or more photonic components with facilitation of a hardware interface.

The photonic abstraction interface driver includes pai_node object. In addition, the pai_node object represents ROADM (reconfigurable optical add-drop multiplexer) node as single entity. Further, the pai_node object is not limited to ROADM node. Furthermore, pai_node object reads node parameters of ROADM node. Moreover, the pai_node object created for ROADM node has two different objects. Also, the two different objects are degree and add-drop port (ADP). In an embodiment of the present disclosure, the photonic abstraction interface driver assigns the object ID to the pai_node object created for ROADM node. In addition, the photonic abstraction interface driver assigns type ID to the pai_node object created for ROADM node. In an embodiment of the present disclosure, the photonic abstraction interface driver creates node objects using command create_node_obj (node id, typeid, attr_count, attr_list). In an embodiment of the present disclosure, the pai_node object includes the plurality of attributes. In addition, the plurality of attributes includes but may not be limited to node type, vendor, version, domain subnetwork, IP, shelf, relay shelf, geographical location, node status, number of degrees or SRGs, maintenance schedule, and hardware specifics.

The photonic abstraction interface driver includes the pai_network. In addition, the pai_network allows user to configure and read data corresponding to each degree or add-drop port in the pai_node. Further, the pai_network creates pai_network object that is linked with the pai_node through node ID. In an embodiment of the present disclosure, the pai_network object is degree. In another embodiment of the present disclosure, the pai_network object is add-drop port. In an embodiment of the present disclosure, the pai_network object distinguishes degree and add-drop port with the type ID. In an embodiment of the present disclosure, the pai_network object created for each of the pai-node is represented by the object ID. In an embodiment of the present disclosure, the pai_network object includes the plurality of attributes. In addition, the plurality of attributes associated with the pai_network of the plurality of application programming interfaces (APIs) includes but may not be limited to degree or add-drop port (ADP) identifier, maximum number of wavelengths, used wavelengths, ingress span loss, end of life (EOL) maximum load, number or add-drop ports, currently provisioned ports, and wavelength duplication.

The photonic abstraction interface driver includes the pai_service. In addition, the pai_service facilitates interconnection of the pai_network inside the pai_node. Further, the pai_service creates pai_service object. Furthermore, the pai_service object includes a plurality of links. Moreover, the plurality of links includes may not be limited to an express link, an add link and a drop link. Also, the plurality of links is distinguished by the type ID. In an embodiment of the present disclosure, the pai_service object is created for at least two pai_network objects. In an example, the pai_service object links the two pai_network objects (degree) with express link. In another example, the express link can carry multiple wavelengths of optical signals. In an embodiment of the present disclosure, the pai_service object includes the plurality of attributes. In addition, the plurality of attributes associated with the pai_service object of the plurality of application programming interfaces (APIs)

includes but may not be limited to link type, traffic engineering (TE) metrics, operational state, link latency and link mapping.

The photonic abstraction interface host de-initializes the photonic abstraction interface driver after completion of process associated with the photonic abstraction interface 104. The photonic abstraction interface host de-initializes the photonic abstraction interface driver with command pai_deinit. In an embodiment of the present disclosure, the photonic abstraction interface driver performs one or more functions during de-initialization. In addition, the one or more functions include but may not be limited to erasing memory and closing files.

FIG. 3 illustrates a block diagram of a computing device 300, in accordance with various embodiments of the present disclosure. The computing device 300 includes a bus 302 that directly or indirectly couples the following devices: memory 304, one or more processors 306, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 3 is merely illustrative of an exemplary computing device 300 that can be used in connection with one or more embodiments of the present invention. Distinction is not made between such categories as "workstation," "server," "laptop," "hand-held device," etc., as all are contemplated within the scope of FIG. 3 and reference to "computing device."

The computing device 300 typically includes a variety of computer-readable media. The computer-readable media can be any available media that can be accessed by the computing device 300 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, non-transitory computer-readable storage medium that stores program code and/or data for short periods of time such as register memory, processor cache and random access memory (RAM), or any other medium which can be used to store the desired information and which can be accessed by the computing device 300. The computer storage media includes, but is not limited to, non-transitory computer readable storage medium that stores program code and/or data for longer periods of time, such as secondary or persistent long term storage, like read only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 300. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. The memory 304 may be removable, non-removable, or a combination thereof. Exemplary hardware devices include solid-state memory, hard drives, optical-disc drives, etc. The computing device 300 includes the one or more processors 306 that read data from various entities such as memory 304 or I/O components 312. The one or more presentation components 308 present data indications to a user or other device. Exemplary presentation components include a display device, speaker, printing component, vibrating component, etc. The one or more I/O ports 310 allow the computing device 300 to be logically coupled to other devices including the one or more I/O components 312, some of which may be built in. Illustrative components include a microphone, joystick, game pad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A system for configuring one or more photonic components, the system comprising: one or more processors; and
    a memory coupled to the one or more processors, the memory for storing instructions which, when executed by the one or more processors, cause the one or more processors to perform a method for configuring the one or more photonic components using a photonic abstraction interface (PAI), the method comprising:
    initializing, at a photonic abstraction system, a photonic abstraction interface driver, wherein the photonic abstraction interface driver is initialized by a photonic abstraction interface host, wherein the photonic abstraction interface host and the photonic abstraction interface driver are layers of the photonic abstraction interface (PAI), wherein the photonic abstraction interface driver translates the photonic abstraction interface (PAI) into a plurality of shared libraries;

calling, at the photonic abstraction system, a node detection function, wherein the node detection function is called using the initialized photonic abstraction interface host, wherein the node detection function detects a node, wherein the detected node allows the photonic abstraction interface driver to call a plurality of application programming interfaces (APIs);

calling, at the photonic abstraction system, the plurality of application programming interfaces (APIs), wherein each application programming interface (API) of the plurality of application programming interfaces (APIs) creates, removes, sets and receives a plurality of attributes, wherein the plurality of attributes is associated with each application programming interface (API) of the plurality of application programming interfaces (APIs).

2. The system as recited in claim 1, wherein the photonic abstraction interface driver is de-initialized, at the photonic abstraction system, wherein the photonic abstraction interface driver is de-initialized by the photonic abstraction interface host, wherein the photonic abstraction interface driver is de-initialized after completion of process associated with the photonic abstraction interface (PAI), wherein the photonic abstraction interface driver performs one or more functions during de-initialization.

3. The system as recited in claim 1, wherein the photonic abstraction interface (PAI) provides a common interface to the one or more photonic components, wherein the one or more photonic components comprise at least one of reconfiguration optical add-drop multiplexer (ROADM) node equipped with wavelength selective switch (WSS), multiple dwelling unit (MDU), amplifiers, variable optical attenuator (VOA) and in-line amplifier (ILA) nodes.

4. The system as recited in claim 1, wherein the plurality of application programming interfaces (APIs) comprises at least one of a pai_node or photonic abstraction interface node, a pai_network or photonic abstraction interface network and a pai_service or photonic abstraction interface service.

5. The system as recited in claim 1, wherein the plurality of attributes associated with a pai_node or photonic abstraction interface node of the plurality of application programming interfaces (APIs) comprises at least one of node type, vendor, version, domain subnetwork, IP, shelf, relay shelf, geographical location, node status, number of degrees or SRGs, maintenance schedule, hardware specifics.

6. The system as recited in claim 1, wherein the plurality of attributes associated with a pai_network or photonic abstraction interface network of the plurality of application programming interfaces (APIs) comprises at least one of degree or add-drop port (ADP) identifier, maximum number of wavelengths, used wavelengths, ingress span loss, end of life (EOL) maximum load, number or add-drop ports, currently provisioned ports, wavelength duplication.

7. The system as recited in claim 1, wherein the plurality of attributes associated with a pai_service or photonic abstraction interface service of the plurality of application programming interfaces (APIs) comprises at least one of link type, traffic engineering (TE) metrics, operational state, link latency and link mapping.

8. The system as recited in claim 1, wherein the photonic abstraction interface driver is de-initialized, at the photonic abstraction system, wherein the photonic abstraction interface driver is de-initialized by the photonic abstraction interface host, wherein the photonic abstraction interface driver is de-initialized after completion of process associated with the photonic abstraction interface (PAI), wherein the photonic abstraction interface driver performs one or more functions during de-initialization, wherein the one or more functions comprise at least one of erasing memory and closing files, wherein the one or more functions are performed by the de-initialized photonic abstraction interface (PAI) to end operations initiated by the photonic abstraction interface (PAI).

9. The system as recited in claim 1, wherein the plurality of application programming interfaces (APIs) comprising a pai_node or photonic abstraction interface node, wherein the pai_node or photonic abstraction interface node represents a ROADM node, wherein the pai_node or photonic abstraction interface node has two different types of object, wherein two different types of object comprise degree and add or drop port (ADP).

10. The system as recited in claim 1, wherein the plurality of application programming interfaces (APIs) comprising a pai_network or photonic abstraction interface network, wherein the pai_network or photonic abstraction interface network allows a user to configure and read data correspond to each degree and add-drop port (ADP).

11. The system as recited in claim 1, wherein the plurality of application programming interfaces (APIs) comprising a pai_service or photonic abstraction interface service, wherein the pai_service or photonic abstraction interface service facilitates interconnection of a pai_network or photonic abstraction interface network inside a pai_node or photonic abstraction interface node, wherein the pai_service or photonic abstraction interface service comprises a plurality of links, wherein the plurality of links comprises at least one of an express link, an add link and a drop link.

12. The system as recited in claim 1, wherein the photonic abstraction system comprises at least one of PAI mux, a plurality of shared libraries and a plurality of hardware devices.

* * * * *